US011543333B2

(12) United States Patent
Cho

(10) Patent No.: US 11,543,333 B2
(45) Date of Patent: Jan. 3, 2023

(54) THERMAL EXTRACTION APPARATUS WITH HIGH VOLUME SAMPLING TRAP

(71) Applicant: The Government of the United States of America, as represented by the Secretary of Homeland Security, Washington, DC (US)

(72) Inventor: Inho Cho, Egg Harbor Township, NJ (US)

(73) Assignee: The Government of the United States of America, as represented by the Secretary of Homeland Security, Washington, DC (US)

( * ) Notice: Subject to any disclaimer, the term of this patent is extended or adjusted under 35 U.S.C. 154(b) by 0 days.

(21) Appl. No.: 17/556,543

(22) Filed: Dec. 20, 2021

(65) Prior Publication Data

US 2022/0107244 A1    Apr. 7, 2022

Related U.S. Application Data

(62) Division of application No. 17/162,984, filed on Jan. 29, 2021, now Pat. No. 11,237,083.

(Continued)

(51) Int. Cl.
*G01N 1/22* (2006.01)
*G01N 1/44* (2006.01)

(52) U.S. Cl.
CPC ......... *G01N 1/2214* (2013.01); *G01N 1/2247* (2013.01); *G01N 1/44* (2013.01)

(58) Field of Classification Search
CPC ....... G01N 2001/022; G01N 2001/028; G01N 1/2214; G01N 2030/8405; G01N 1/40;
(Continued)

(56) References Cited

U.S. PATENT DOCUMENTS 3,693,457 A * 9/1972 Pilat .................. G01N 15/0255
73/865.5
4,301,002 A * 11/1981 Loo .......................... B07B 7/00
209/143

(Continued)

FOREIGN PATENT DOCUMENTS

| CA | 2112901 C | 5/1999 |
| CN | 209856440 U | 12/2019 |
| EP | 3631840 A4 | 2/2021 |

*Primary Examiner* — David A. Rogers
(74) *Attorney, Agent, or Firm* — Lavanya Ratnam; Robert W. Busby; William Washington

(57) ABSTRACT

In an example, a thermal extraction apparatus includes: a housing having a gas inlet and a gas outlet to receive a gas flow through the housing from the gas inlet to the gas outlet, and a side opening to receive a sample collector, having a sample collector adsorbent containing a vapor sample, into a sample collector location; a pump to generate the gas flow; a heater to heat the sample collector adsorbent of the sample collector to a temperature sufficient to release the vapor sample; a thermal desorption (TD) tube connected with the gas outlet of the housing to receive the gas flow downstream of the sample collector and collect the vapor sample released from the sample collector adsorbent of the sample collector; and a cooling member in heat exchange with the TD tube to cool the TD tube.

22 Claims, 14 Drawing Sheets

Related U.S. Application Data

(60) Provisional application No. 63/052,674, filed on Jul. 16, 2020.

(58) Field of Classification Search
CPC ............. G01N 1/405; G01N 2030/025; G01N 2030/121; G01N 2030/125; G01N 1/24; G01N 1/2273; G01N 1/22; G01N 2001/2223; G01N 1/2205; G01N 2001/2285; G01N 33/0009; G01N 15/0606; G01N 2001/024; G01N 2030/008; G01N 2033/0019; G01N 33/0037; G01N 33/227; G01N 33/48714
See application file for complete search history.

(56) References Cited

U.S. PATENT DOCUMENTS

| | | | |
|---|---|---|---|
| 4,580,440 A | 4/1986 | Reid et al. | |
| 4,640,140 A * | 2/1987 | Burghoffer | G01N 15/0255 73/863.22 |
| 4,767,524 A * | 8/1988 | Yeh | B07B 7/00 209/133 |
| 4,819,477 A | 4/1989 | Fisher et al. | |
| 4,909,090 A | 3/1990 | McGown et al. | |
| 5,040,424 A * | 8/1991 | Marple | G01N 15/0272 73/863.23 |
| 5,092,155 A | 3/1992 | Rounbehler et al. | |
| 5,092,156 A | 3/1992 | Miskolczy | |
| 5,092,157 A | 3/1992 | Achter et al. | |
| 5,092,217 A | 3/1992 | Achter et al. | |
| 5,092,218 A | 3/1992 | Fine et al. | |
| 5,092,219 A | 3/1992 | Rounbehler et al. | |
| 5,092,220 A | 3/1992 | Rounbehler | |
| 5,098,451 A | 3/1992 | Rounbehler et al. | |
| 5,099,743 A | 3/1992 | Rounbehler et al. | |
| 5,123,274 A | 6/1992 | Carroll et al. | |
| 5,310,681 A | 5/1994 | Rounbehler et al. | |
| 5,551,278 A | 9/1996 | Rounbehler et al. | |
| 6,167,767 B1 | 1/2001 | Mengel et al. | |
| 6,651,520 B1 | 11/2003 | Allen et al. | |
| 6,828,795 B2 | 12/2004 | Krasnobaev et al. | |
| 6,861,646 B2 | 3/2005 | Motchkine et al. | |
| 6,883,364 B2 | 4/2005 | Sunshine et al. | |
| 6,895,804 B2 | 5/2005 | Lovell et al. | |
| 6,907,796 B2 * | 6/2005 | Bremer | G01N 30/12 219/628 |
| RE38,797 E | 9/2005 | Linker et al. | |
| 7,100,461 B2 | 9/2006 | Bradley et al. | |
| 7,325,465 B2 * | 2/2008 | Solomon | G01N 15/0255 73/863.22 |
| 7,662,630 B2 * | 2/2010 | Tipler | G01N 33/0011 422/65 |
| 7,836,751 B2 | 11/2010 | Marra | |
| 7,841,244 B2 | 11/2010 | Barket, Jr. et al. | |
| 7,992,424 B1 | 8/2011 | Grossenbacher | |
| 7,997,119 B2 | 8/2011 | Wu | |
| 8,113,069 B2 | 2/2012 | Settles | |
| 8,127,595 B2 * | 3/2012 | Finlay | G01N 1/405 73/31.07 |
| 8,146,448 B2 | 4/2012 | Briscoe et al. | |
| 8,161,797 B1 | 4/2012 | Genovese et al. | |
| 8,178,045 B2 | 5/2012 | Cambron et al. | |
| 8,307,723 B2 | 11/2012 | Novosselov et al. | |
| 8,377,711 B2 | 2/2013 | Henry et al. | |
| 8,410,431 B2 | 4/2013 | Ouyang et al. | |
| 8,569,691 B2 | 10/2013 | Cambron et al. | |
| 8,578,796 B2 | 11/2013 | Cho | |
| 8,607,616 B2 | 12/2013 | Marra | |
| 8,646,340 B2 | 2/2014 | Zhang et al. | |
| 8,668,873 B2 | 3/2014 | Almirall et al. | |
| 8,733,185 B2 * | 5/2014 | Solomon | B01D 45/08 73/863.22 |
| 8,857,278 B2 * | 10/2014 | Syage | G01N 1/2205 73/864.34 |
| 9,086,341 B2 * | 7/2015 | Tsai | G01N 1/2208 |
| 9,335,236 B2 | 5/2016 | Bry et al. | |
| 9,528,969 B2 | 12/2016 | Shaw et al. | |
| 9,683,981 B1 * | 6/2017 | Vilkov | G01N 1/405 |
| 9,816,902 B2 | 11/2017 | Weling et al. | |
| 10,175,198 B2 | 1/2019 | Briglin et al. | |
| 10,215,666 B2 | 2/2019 | Zhang et al. | |
| 10,281,432 B2 * | 5/2019 | Zhang | H01J 49/0422 |
| 10,466,149 B2 | 11/2019 | Weling et al. | |
| 10,539,531 B2 | 1/2020 | Zhang et al. | |
| 2004/0069046 A1 | 4/2004 | Sunshine et al. | |
| 2007/0158447 A1 | 7/2007 | Bunker | |
| 2008/0302237 A1 | 12/2008 | Grate et al. | |
| 2009/0114090 A1 | 5/2009 | Gu et al. | |
| 2011/0162443 A1 | 7/2011 | Pitkanen et al. | |
| 2011/0203931 A1 | 8/2011 | Novosselov et al. | |
| 2014/0345370 A1 | 11/2014 | Marotta | |
| 2015/0143929 A1 | 5/2015 | Volckens et al. | |
| 2015/0163857 A1 | 6/2015 | Shaw et al. | |
| 2015/0219532 A1 | 8/2015 | Aono | |
| 2018/0217030 A1 | 8/2018 | Kendall et al. | |
| 2019/0041305 A1 | 2/2019 | Bowers, IIet al. | |
| 2019/0195899 A1 | 6/2019 | Hill, Jr. et al. | |
| 2019/0212230 A1 | 7/2019 | Novosselov | |

* cited by examiner

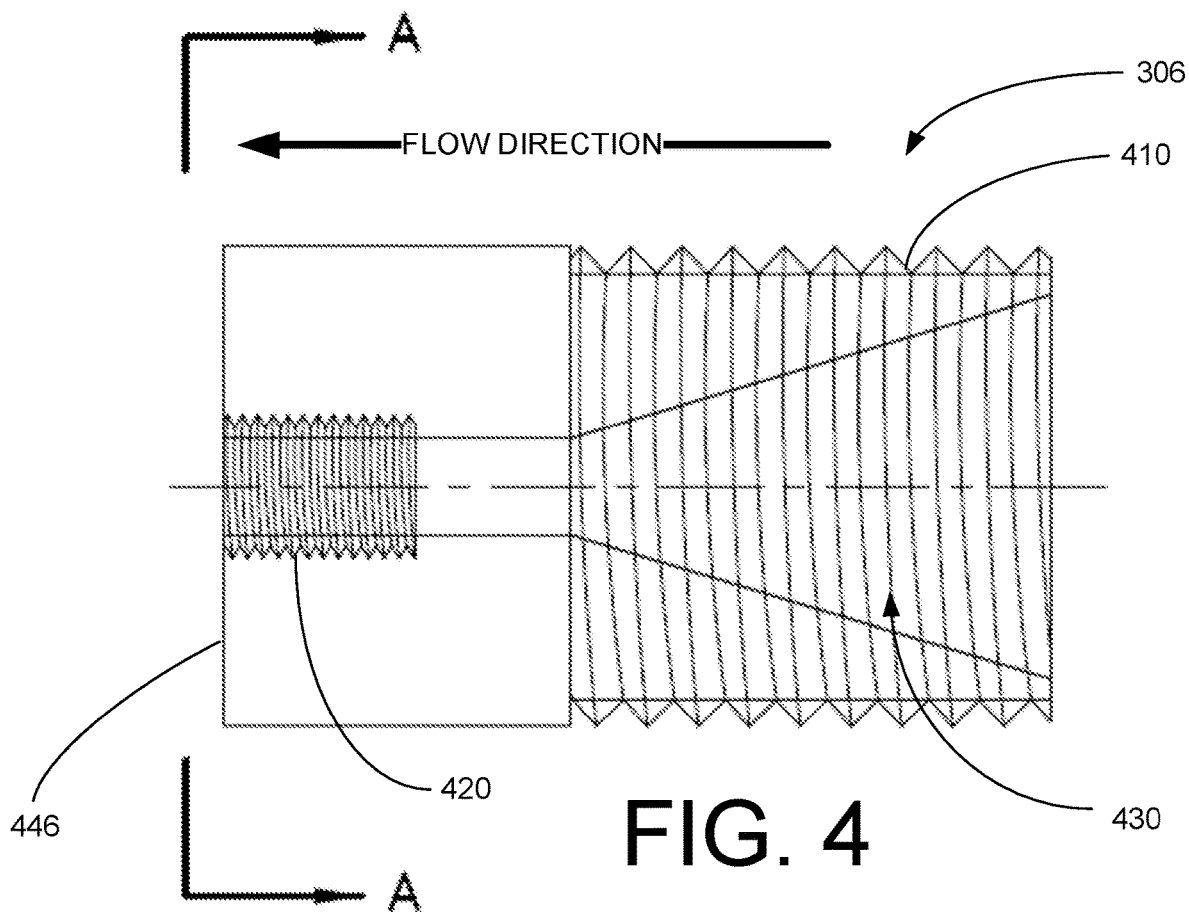
FIG. 4
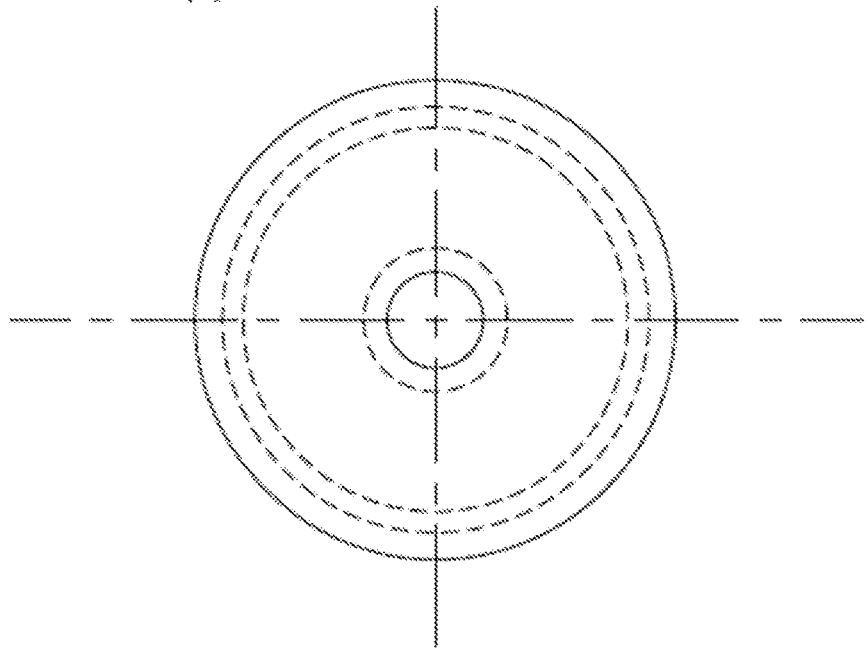
FIG. 4A   SECTION "A"

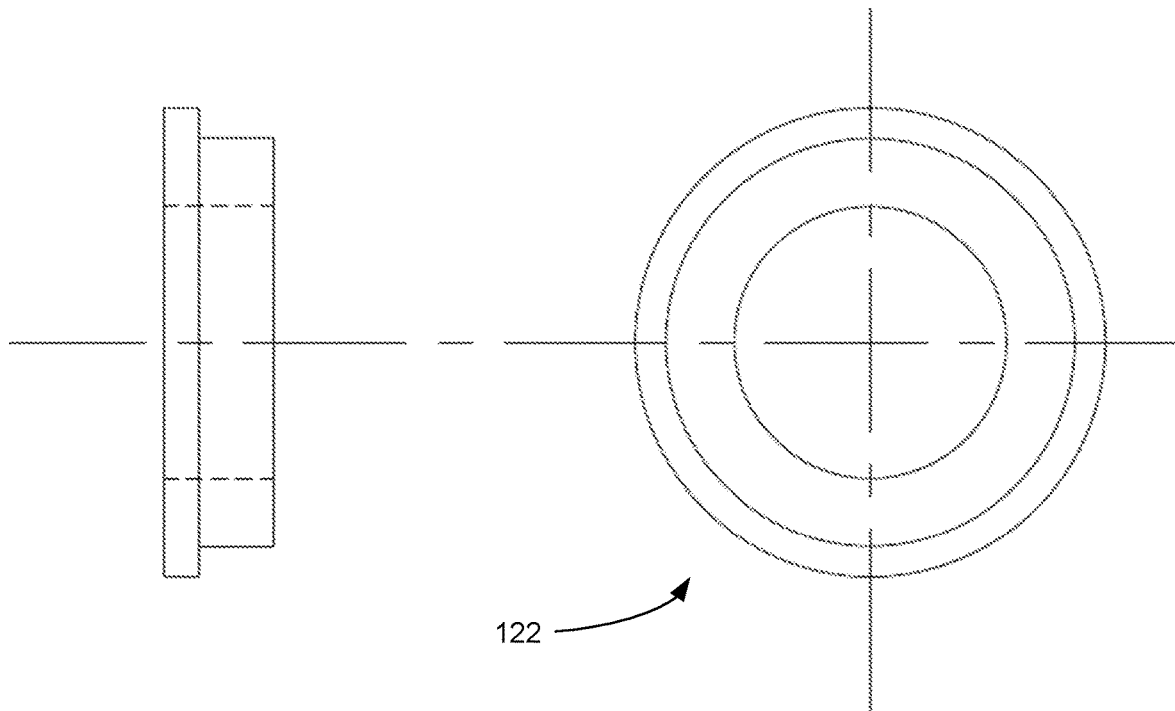
FIG. 5A  FILTER HOLDER LEFT  FIG. 5B
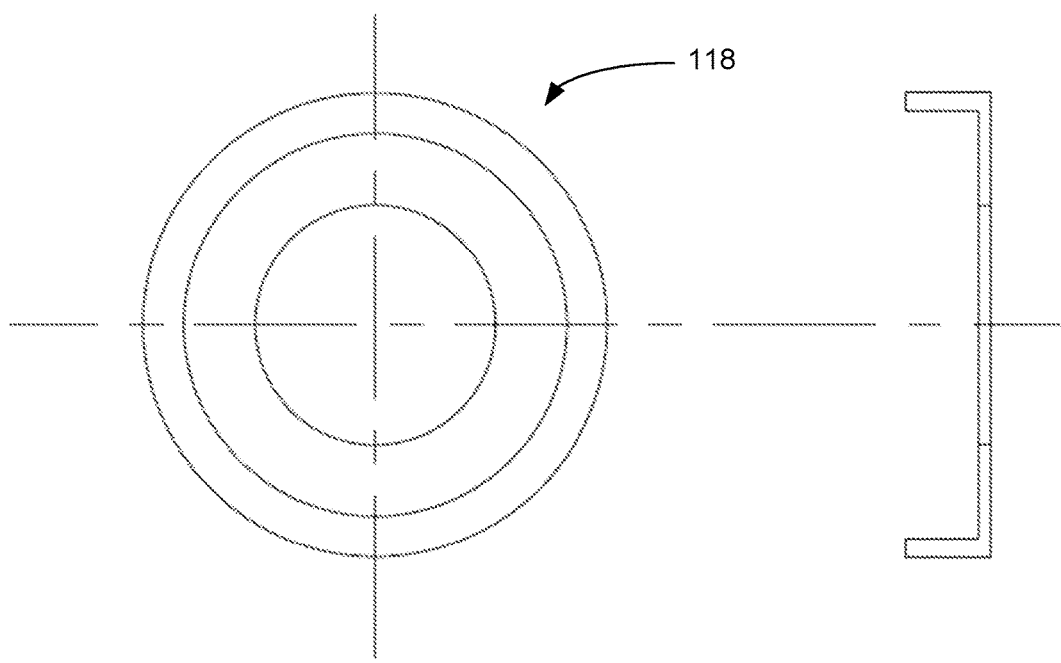
FIG. 5C  FILTER HOLDER RIGHT  FIG. 5D

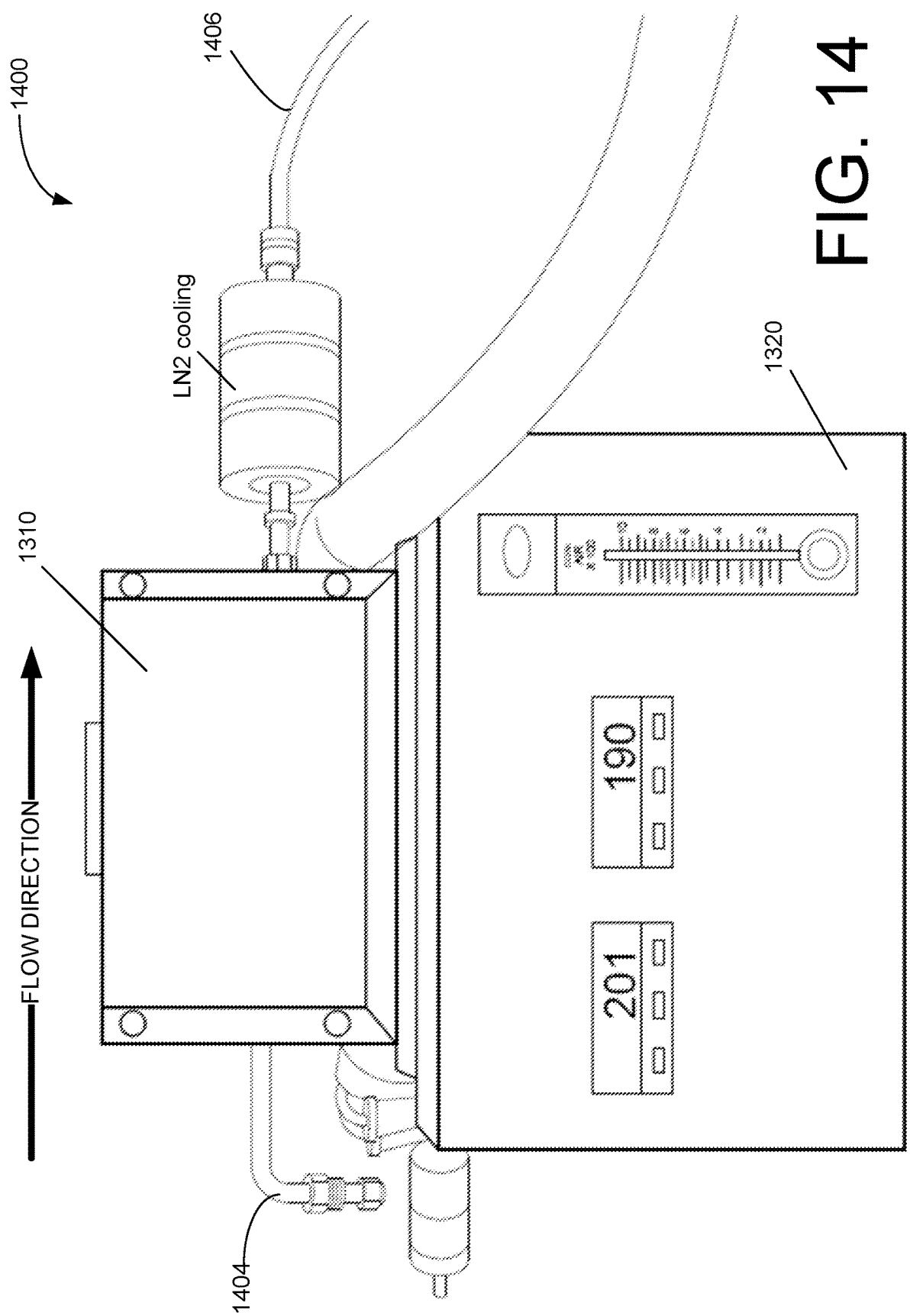

THERMAL EXTRACTION APPARATUS WITH HIGH VOLUME SAMPLING TRAP

CROSS-REFERENCE TO RELATED APPLICATIONS

The application is a divisional of and claims the benefit of U.S. patent application Ser. No. 17/162,984, entitled HIGH VOLUME SAMPLING TRAP THERMAL EXTRACTION DEVICE, filed on Jan. 29, 2021, which claims priority from U.S. Provisional Patent Application No. 63/052,674, filed on Jul. 16, 2020, entitled HIGH VOLUME SAMPLING TRAP THERMAL EXTRACTION DEVICE, the entire disclosures of which are incorporated herein by reference.

SUMMARY STATEMENT OF GOVERNMENT INTEREST

The present invention was made by employees of the United States Department of Homeland Security in the performance of their official duties. The U.S. Government has certain rights in this invention.

FIELD

The discussion below relates generally to systems and methods for high-volume sampling and, more specifically, to a thermal extraction device (TED) to thermally extract materials collected by a particle and vapor collection device such as a high volume sampling trap (HVST).

BACKGROUND

Sampling devices, specifically those used to screen large number of people or items, have been used for some time. These devices can be found almost anywhere, including government-run office buildings and airports. For example, airports use body scanners, utilizing machines that allow security officers an unobstructed view of a person's body to determine the presence of weapons. Other methods test for less visible items or substances, such as explosive residue or narcotics. Specifically, much focus has been put towards detection methods for these less visible substances as terrorism has risen, inasmuch as explosives, biochemical weapons, and the like threaten the security of the United States.

Liquid preparations have been used in detection methodologies. For example, a liquid is first applied to a surface to solvate or otherwise place into liquid phase the substance of interest which may be residing on the surface. Then, that mixture is tested. While such sampling devices are reliable, they suffer from many disadvantages, one of which is efficiency. Generally, in high volume situations it would take too much time to prepare liquid samples for every surface requiring testing.

Some detection systems require encapsulating the entire object, the surfaces of which require sampling. These systems involve large chambers, and therefore require a large footprint in which to operate. Handheld sampling wands also exist. However, many of these wands are tethered to stationary detection units, thereby hindering an operator's movement when climbing over parcels and crates. Other detection systems include vapor deposition systems whereby adsorbents sequester vapors containing target moieties. Such systems often do not allow for simultaneous extraction and sequestration of solid phase and/or liquid phase samples.

U.S. Pat. No. 8,578,796 to Cho discloses a device for sampling surfaces for the presence of compounds, including a housing having a proximal end adapted to receive a negative pressure gradient and a distal end adapted to contact the surfaces; a heating element spaced from the distal end; a primary filter spaced from the heating element; and a secondary filter spaced from the primary filter, the secondary filter removably received by the housing. A method for sampling a surface for the presence of compounds includes contacting the surface to dislodge the compounds from the surface; capturing first fractions of the compounds with a primary filter while allowing second fractions of the compounds to pass through the primary filter; heating the primary filter to volatilize the first fractions; capturing the volatized first fractions and the second fractions with a secondary filter; and analyzing the secondary filter to identify the compounds. The detection system is portable or stationary, light weight, and low cost. It utilizes off the shelf componentry, is capable of simultaneous sequestration of multi-phases of target compounds, and allows continued sequestration of target compounds in the field by facilitating in situ replacement of full sample carriers with empty ones.

SUMMARY

Embodiments of the present invention are directed to apparatuses and methods for thermally extracting vapor samples collected with a sample trap using a thermal desorption (TD) collector such as a TD tube, which can then be inserted into a mass spectrometer for direct sample analysis. One example of the sample trap is the secondary filter disclosed in U.S. Pat. No. 8,578,796 which also employs a primary filter to capture relatively large particles and a heater to heat and vaporize the captured particles. An adsorbent resin, as a sample collector adsorbent in the sample trap, collects the vaporized sample. See, e.g., U.S. Pat. No. 8,578,796 at column 7, line 18 to column 8, line 67 and in FIGS. 5 and 6, which is incorporated herein by reference. In another embodiment, the sample trap including an adsorbent resin is used to collect vapor-phase particle sample and potentially micrometer-sized particle sample, by adapting it to a vacuum device, without using the primary filter and heater. The sample trap may be referred to as a high volume sampling trap (HVST), which can be used to collect a large volume of the air samples from cargo container freight, palletized cargo, and security checkpoint to trap illicit organic volatile materials. The vacuum device is light-weight and portable, and can be used in other applications, such as sample collection at airports or other checkpoints, which involve smaller volumes of air sample collection.

The sample trap is placed into a TED, which may be referred to as an HVST-TED. The device may include a heater to heat the sample trap to about 200° C. and a gas flow is used to move the heated vapor-phase sample and any semi-volatile organic compound sample to a TD collector such as a TD tube disposed downstream. The TD tube may be cooled to about 0-10° C. for collecting the vapors and analytes. The use of the TD tube facilitates direct analysis on a mass spectrometer to identify the chemical species released from the sample trap, by removing the TD tube from the TED and inserting it directly into a Thermal Desorption-Gas Chromatography/Mass Spectrometer (TD-GC/MS) for sample analysis. As such, the HVST desorber has been modified for better sample recovery on a TD tube. The use of the TD tube provides a one-step analysis of the trapped sample.

In accordance with one aspect, a thermal extraction apparatus comprises: a housing having a gas inlet and a gas outlet to receive a gas flow through the housing from the gas inlet to the gas outlet, and a side opening to receive a sample collector into a sample collector location, the sample collector having a sample collector adsorbent containing a vapor sample; a pump to generate the gas flow; a heater to heat the sample collector adsorbent of the sample collector to a temperature sufficient to release the vapor sample; a TD tube connected with the gas outlet of the housing to receive the gas flow downstream of the sample collector and collect the vapor sample released from the sample collector adsorbent of the sample collector; and a cooling member in heat exchange with the TD tube to cool the TD tube.

In accordance with another aspect, a thermal extraction apparatus comprises: a housing having a gas inlet and a gas outlet to receive a gas flow through the housing from the gas inlet to the gas outlet, and an insertion port to receive a sample collector having a sample collector adsorbent containing a vapor sample; a pump to generate the gas flow; a heating mechanism for heating the sample collector adsorbent of the sample collector to a temperature sufficiently high to facilitate release of the vapor sample from the sample collector adsorbent of the sample collector; and a TD tube connected with the gas outlet of the housing to receive the gas flow downstream of the sample collector and collect the vapor sample released from the sample collector adsorbent of the sample collector.

In accordance with yet another aspect, a thermal extraction method comprises: placing a sample collector, which has a sample collector adsorbent containing a vapor sample, inside a housing via a side opening; heating the sample collector adsorbent of the sample collector to a temperature sufficiently high to facilitate release of the vapor sample from the sample collector adsorbent and directing a gas flow through a gas inlet of the housing through the sample collector adsorbent of the sample collector through a gas outlet of the housing to a TD tube connected with the gas outlet of the housing to receive the gas flow downstream of the sample collector and collect the vapor sample released from the sample collector adsorbent of the sample collector inside the TD tube.

Other features and aspects of various examples and embodiments will become apparent to those of ordinary skill in the art from the following detailed description which discloses, in conjunction with the accompanying drawings, examples that explain features in accordance with embodiments. This summary is not intended to identify key or essential features, nor is it intended to limit the scope of the invention, which is defined solely by the claims.

BRIEF DESCRIPTION OF THE DRAWINGS

The attached drawings help explain the embodiments described below.

FIG. 4 shows an elevational view of the secondary housing of FIG. 3.

FIG. 4A shows a side view A-A of the secondary housing of FIG. 4.

FIG. 5A shows a side view of the left holder according to an embodiment.

FIG. 5B shows a front elevational view of the left holder.

FIG. 5C shows a front elevational view of the right holder according to an embodiment.

FIG. 5D shows a side view of the right holder.

FIG. 14 shows an example of a thermal extraction system including the HVST-TED and external housing of FIG. 13.

DETAILED DESCRIPTION

Figure 1:
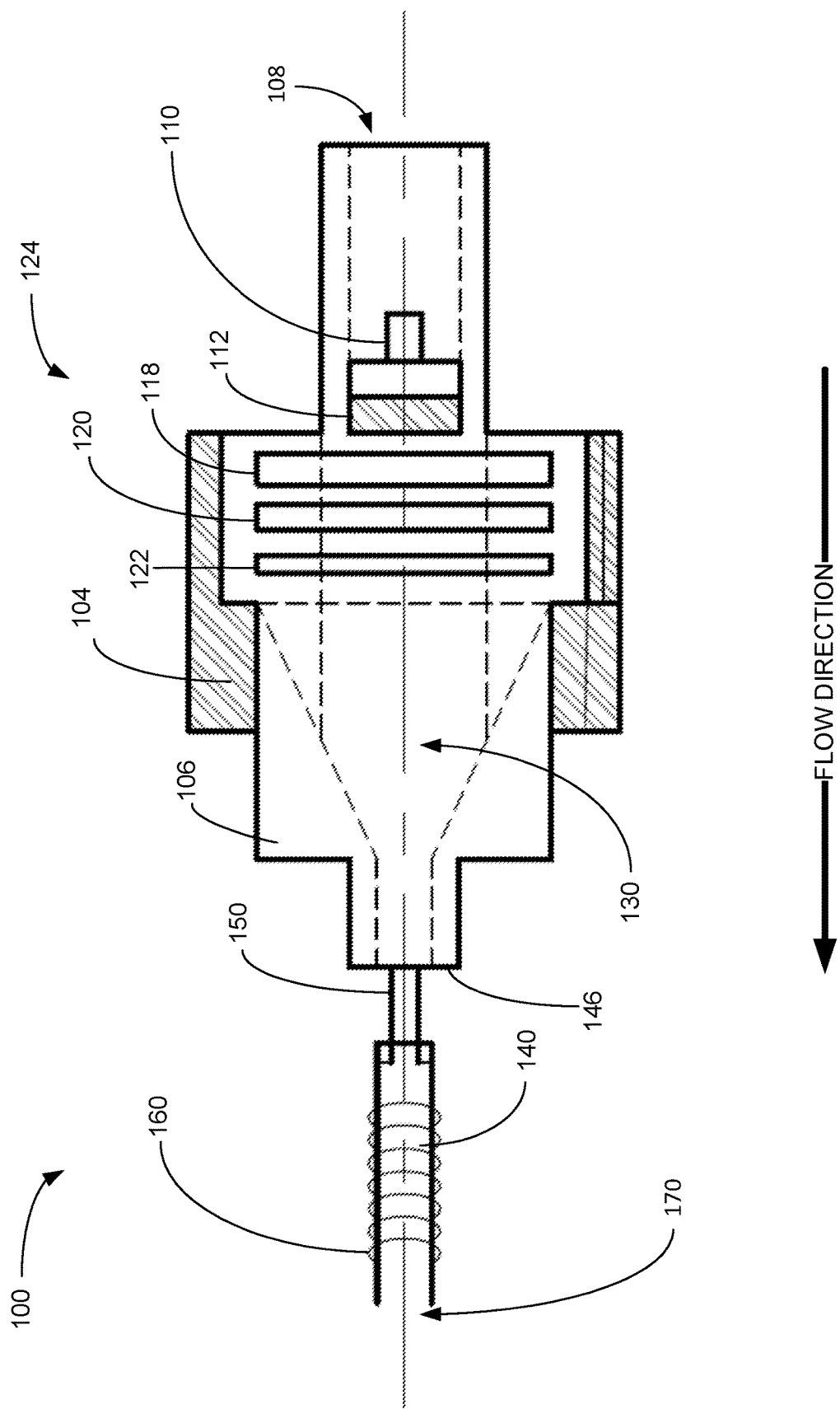
FIG. 1 is a cross-sectional view of a high volume sampling trap thermal extraction device (HVST-TED) according to an embodiment of the present invention.

A number of examples or embodiments of the present invention are described, and it should be appreciated that the present invention provides many applicable inventive concepts that can be embodied in a variety of ways. The embodiments discussed herein are merely illustrative of ways to make and use the invention and are not intended to limit the scope of the invention. Rather, as will be appreciated by one of skill in the art, the teachings and disclosures herein can be combined or rearranged with other portions of this disclosure along with the knowledge of one of ordinary skill in the art.

In large volume sampling, a high volume sampling (HVS) device is adapted to be in fluid communication with a target such as a ventilation port of a cargo container such that, for example, the device is placed upstream or downstream of the ventilation port, or perhaps within and coaxial to the port. In one example, the HVS device is a vacuum device, which may be portable, for directing a flow of sample through a sample trap containing an adsorbent for trapping vapor-phase sample and any semi-volatile organic compound sample. The sample trap, which may be referred to as an HVS trap or H-trap, is then placed into a thermal extraction device (TED). The HVS device can be applied to the break bulk, pelletized or containerized air/sea cargo. Also, the device can be utilized on chemical and biological warfare agent samples, industrial toxic chemicals, explosives particle samples, and drugs or hazardous waste sampling. The HVS device facilitates large volume of air sample collection from a large screening area. The military explosive, Composition C-4, can be used as a standard explosive for the device particle sample testing. Vapor Sample C-4 includes Triacetone triperoxide (TATP) and Ethylene glycol dinitrate (EGDN).

Generally, the TED includes a heating device such as a heating cartridge for heating the sample trap and a thermal desorption collector such as a TD tube positioned downstream of the sample trap. The TD tube may include a polymer adsorbent to trap vapor samples. The heating cartridge and sample trap are supported by a housing so as to be substantially encased by the housing.

In an embodiment, the sample trap is heated to evaporate the target compounds that are trapped. The vaporized compounds are directed by a gas flow from the sample trap to the TD tube to be re-trapped in the TD tube. During the process, about 1 to 4 L/min of flow, for example, will be applied to the sample trap for carrying target moieties from the sample trap to the TD tube.

In an embodiment, an aluminum housing holds a removable sample trap and a heater to heat the sample trap. A TD tube is spaced from and disposed downstream of the sample trap along a gas flow to collect vapor-phase sample and any semi-volatile organic compound sample. In one example, heating members such as heating cartridges are provided upstream and downstream of the sample trap to generate a temperature gradient that is higher upstream of the sample trap and lower downstream of the sample trap.

In one example, the TD tube, comprised of a polymer adsorbent material such as Tenax, collects vapors and analytes from the sample trap after the sample trap is heated up to about 200° C. within about 60-120 seconds to vaporize some of the particles and analytes collected from the sample trap. The TD tube is cooled to about 0-10° C. for collecting the vapors and analytes. The TD tube is then easily removed and inserted directly into a Thermal Desorption-Gas Chromatography/Mass Spectrometer (TD-GC/MS) for sample analysis.

FIG. 1 is a cross-sectional view of a high volume sampling trap thermal extraction device (HVST-TED) 100 according to an embodiment of the present invention. The device 100 includes a main housing 104 and a secondary housing 106 connected to a proximal end of the main housing 104. In some embodiments, the secondary housing 106 is disposed at least partially or completely inside the main housing 104. Along the direction of gas flow from an inlet at the distal end 108 toward a proximal end 146 of the secondary housing 106, disposed inside the main housing 104 are a heater 110 (including a hot plate 112 in the embodiment shown), a right holder 118, a sample trap or collector 120, and a left holder 122. The gas can be air. The right holder 118, sample trap 120, and left holder 122 form a sample trap assembly 124 that can be inserted into and removed from the main housing 104. Downstream of the left holder 122 is a downstream frustoconical cavity 130 of the secondary housing 106 which contracts in cross-sectional area in the downstream direction and leads to a TD collector 140 connected to the proximal end 146 of the secondary housing 106 via a proximal connector 150. One example of the TD collector 140 is a TD tube 140 wrapped around by a cooling coil or tubing 160 having a flow of cooling fluid such as liquid nitrogen (LN2) for cooling the TD tube 140 by heat exchange. The gas flow exits at a proximal end 170 of the device 100, which in one embodiment is connected to a vacuum pump. This is one means for cooling the TD tube. Other cooling means or mechanisms may be used for cooling the TD tube in other embodiments.

High volume sampling encompasses sample volumes as high as approximately 400 liters per minute of air using a 1-inch inner diameter input aperture such as a 1" ID sample tube connected at the distal end 108. Higher sample volumes are attainable if input diameters increase. Either the distal end 108 of the device 100 may be adapted to receive pressurized effluent or the proximal end 170 of the device 100 may be adapted to establish fluid communication with negative pressure (i.e., a vacuum pull). In one example, a vacuum pull is established between the proximal end 170 and a vacuum line via a snap fit assembly or threaded connectors. The proximal end 146 of the secondary housing 106 defines a ¼" Teflon ferrule with a compression fitting nut to effectuate a negative pressure pull with a vacuum hose.

Prior to thermal extraction, the sample trap assembly 124 may be attached to a commercial vacuum system with some modifications to collect target sample. For instance, the vacuum system may be adapted to be in fluid communication with a target such as a ventilation port of a cargo container. Examples of the vacuum system include the Dayton Backpack Vacuum system (Model 4TRI0) and the Dyson handheld vacuum system (Model V6).

Figures 2, 2A, 2B:
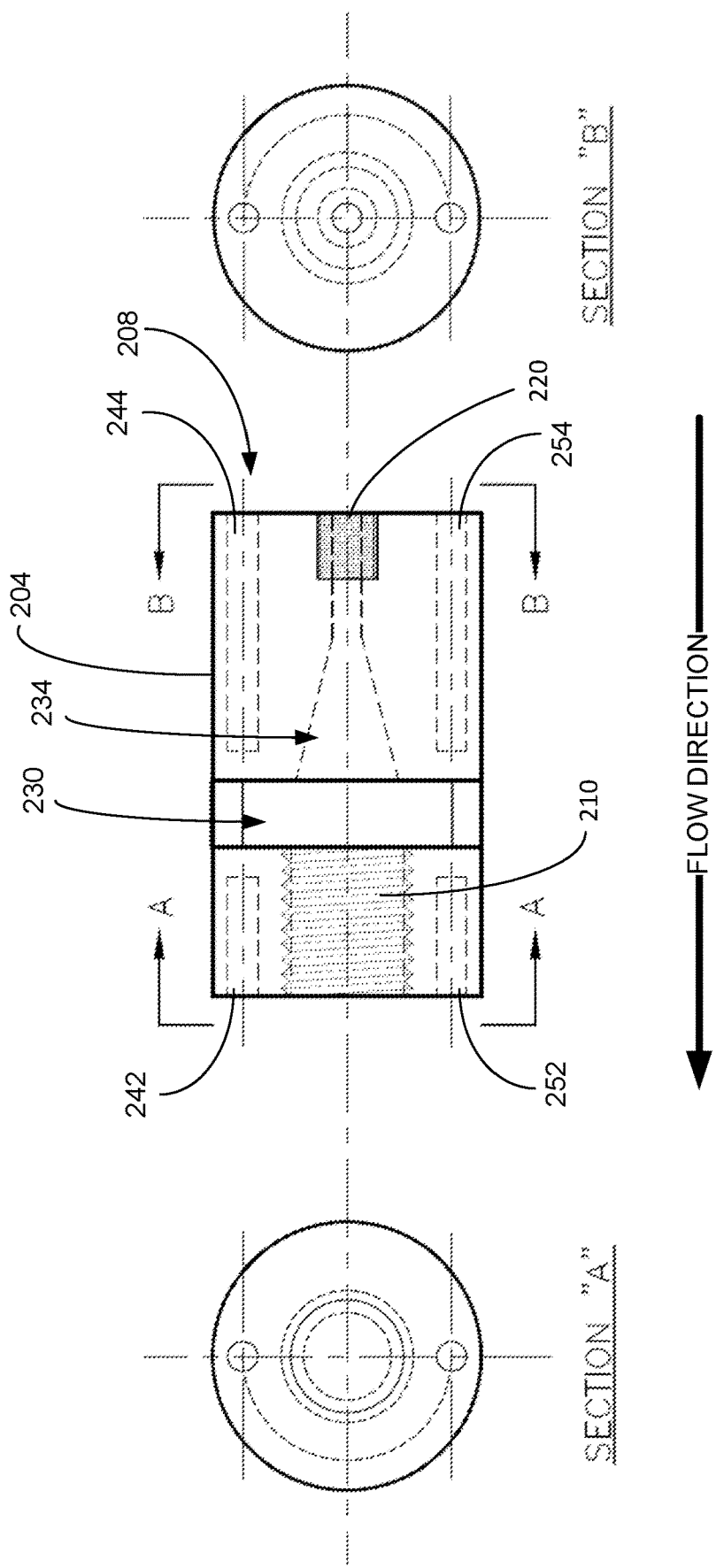
FIG. 2 shows an elevational view of a main housing of the HVST-TED according to another embodiment.
FIG. 2A shows a side view A-A of the main housing of FIG. 2.
FIG. 2B shows a side view B-B of the main housing of FIG. 2.

FIG. 2 shows an elevational view of a main housing of the HVST-TED according to another embodiment. FIG. 2A shows a side view A-A of the main housing of FIG. 2. FIG. 2B shows a side view B-B of the main housing of FIG. 2. The main housing 204 includes a proximal internally threaded section 210 for receiving a secondary housing similar to the secondary housing 106 of FIG. 1 on the proximal side. The main housing 204 includes a distal internally threaded section 220 for connecting to an air intake at the distal end 208. The main housing 204 has a side opening or slot 230 which is a complementary aperture or insertion port formed along a longitudinally extending surface of the main housing 204 for receiving the sample trap assembly 124 into a sample collector location in the main housing 204. The side opening 230 defines a plane which is positioned transverse to the longitudinal axis of the main housing 204. The main housing 204 has an upstream frustoconical cavity 234 that expands in cross-sectional area from the distal internally threaded section 220 near the distal end 208 in a downstream direction toward the proximal internally threaded section 210 near the proximal end of the main housing 204.

In the embodiment shown in FIG. 2, instead of a hot plate 112 in FIG. 1, heating cartridges 242, 244 may be provided in the main housing 204 for heating and RTD (resistance temperature detector) probes 252, 254 may be provided in the main housing 204 for measuring temperature. These components are commercially available and are cylindrical in shape. The upstream heating cartridge 244 and upstream RTD probe 254 are disposed upstream of the sample trap assembly 124 that is inserted into the side opening 230. The downstream heating cartridge 242 and downstream RTD probe 252 are disposed downstream of the sample trap assembly 124. In one example, the upstream heating cartridge 244 and upstream RTD probe 254 each have a dimension of about 2" in length X ¼" in OD and the downstream heating cartridge 242 and downstream RTD probe 252 each have a dimension of about 1" in length X ¼" in OD. Also, thermometers other than RTD probes are used in other embodiments. The hot plate 112 and heating cartridges 242, 244 are example means for heating the sample collector adsorbent in the sample trap assembly 124. Other heating means or mechanisms for heating the sample collector adsorbent may be used instead of the examples described herein.

The heating cartridges 242, 244 and RTD probes 252, 254 are seen as being reversibly or releasably attached to the main housing 204. However, heating cartridges and RTD probes are integrally molded to the main housing 204 in another embodiment. The main housing 204 is heated at the start of the thermal extraction process.

Figure 3:
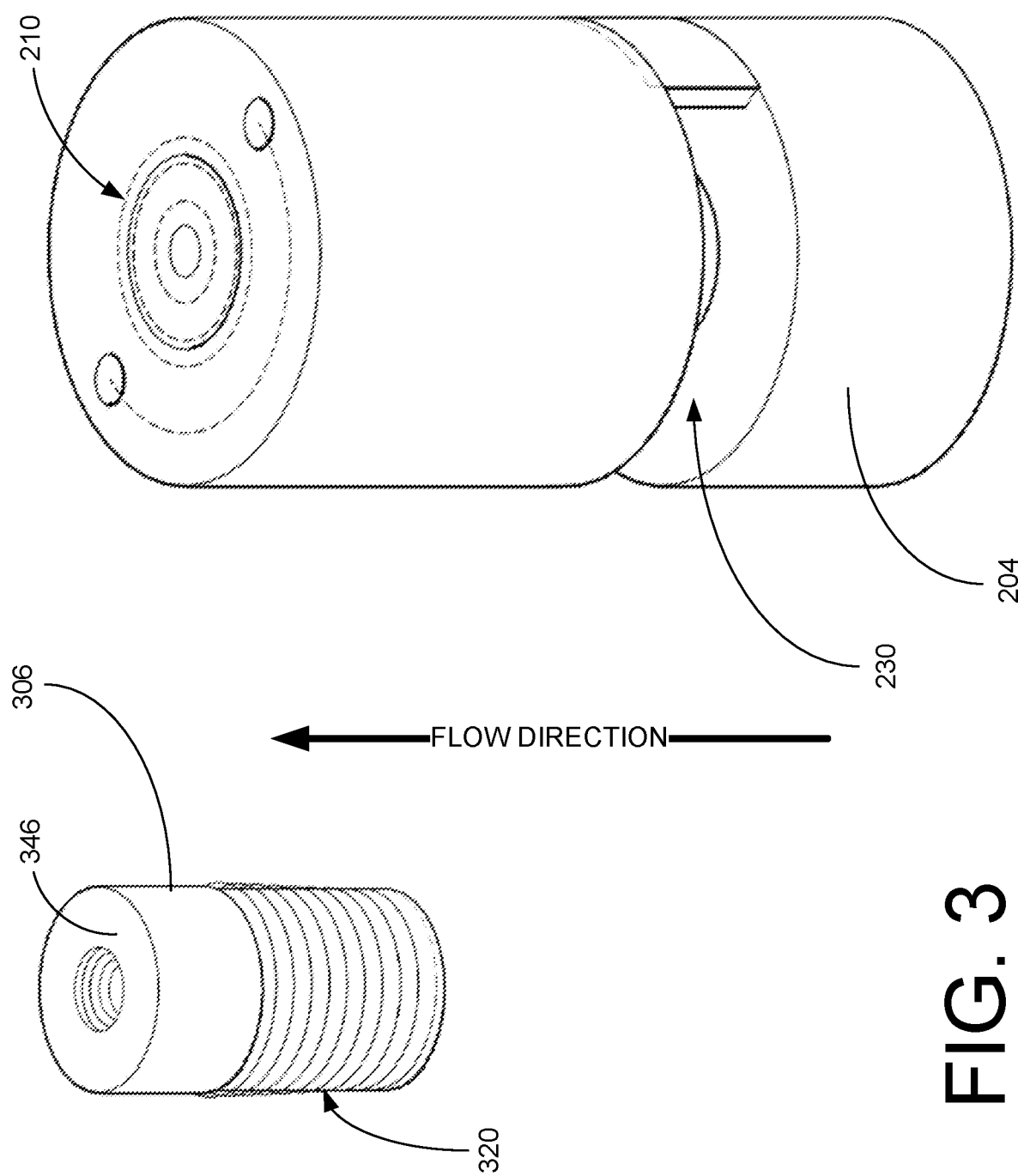
FIG. 3 shows an exploded perspective view of the main housing of FIG. 2 and a secondary housing coupled to the proximal side of the main housing.

FIG. 3 shows an exploded perspective view of the main housing 204 of FIG. 2 and a secondary housing 306 coupled to the proximal side of the main housing 204. The main housing 204 includes the side opening 230 for receiving the sample trap assembly 124. It is cylindrical so as to allow for easy manipulation by a single hand of a user. Other shapes are also envisioned. The secondary housing 306 has a proximal end 346 and includes a distal externally threaded section 320 for engaging with the proximal internally threaded section 210 of the main housing 204 shown in FIG. 2.

FIG. 4 shows an elevational view of the secondary housing 306 of FIG. 3. FIG. 4A shows a side view A-A of the secondary housing of FIG. 4. The secondary housing 306 may include a downstream frustoconical cavity 430, similar to the downstream frustoconical cavity 130 of FIG. 1, which contracts in cross-sectional area from the distal end of the secondary housing 306 toward the proximal end 446. It may include a proximal internally threaded section 420 for receiving a proximal connector similar to the proximal connector 150 of FIG. 1 for connecting to a TD tube. It may have a distal externally threaded section 410 for engaging the proximal internally threaded section 210 of the main housing 204 of FIG. 2.

FIG. 5A shows a side view of the left holder 122 according to an embodiment. FIG. 5B shows a front elevational view of the left holder 122. FIG. 5C shows a front elevational view of the right holder 118 according to an embodiment. FIG. 5D shows a side view of the right holder 118.

Figure 6:
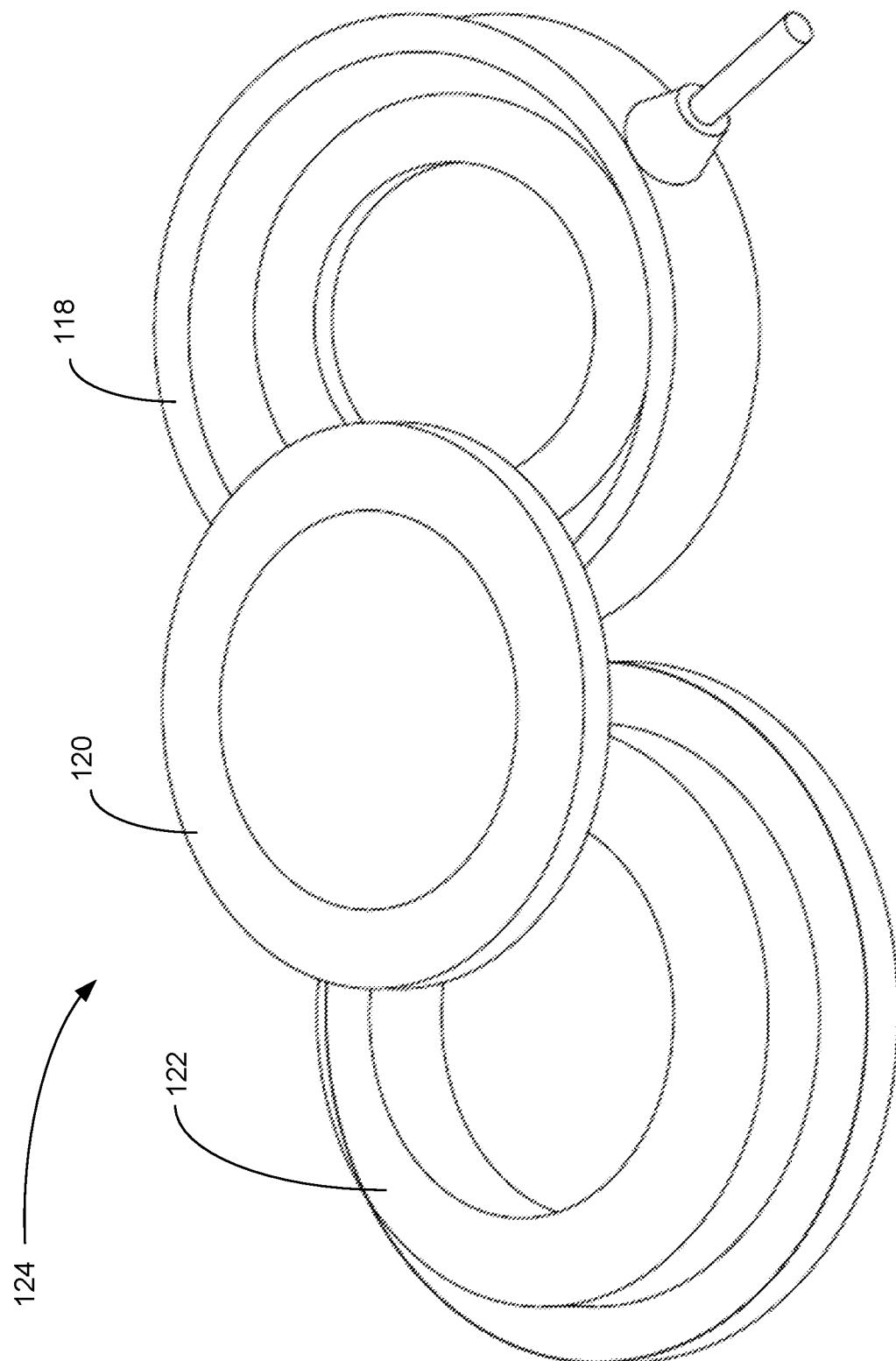
FIG. 6 shows an example of a sample trap, a left holder, and a right holder of a sample trap assembly.

FIG. 6 shows an example of the sample trap 120, the left holder 122, and the right holder 118 of the sample trap assembly 124. The left holder 122 is matingly received by the right holder 118 to form an interior space to receive the sample trap 120. The interior space has a depth measuring approximately the thickness of the sample trap 120. The left holder 122 and the right holder 118 may at least substantially completely encase the sample trap 120. The sample trap 120 may include an adsorbent resin used to collect vapor-phase sample and any micrometer-sized particle sample prior to being inserted into the main housing 206 via the side opening 230 for thermal extraction.

Figure 7:
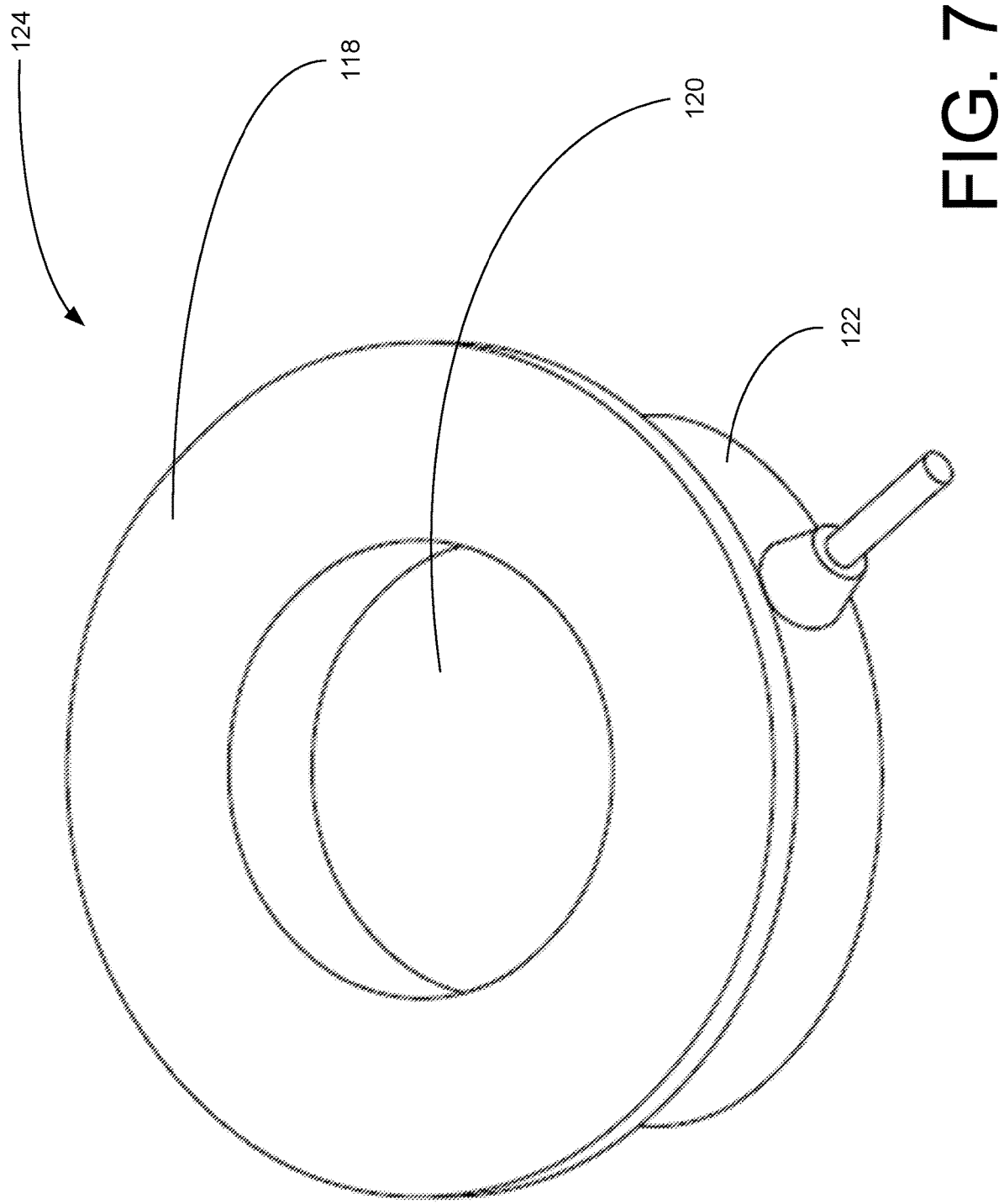
FIG. 7 shows the sample trap assembly of FIG. 6.

FIG. 7 shows the sample trap assembly 124 of FIG. 6 in assembled form.

Figure 8:
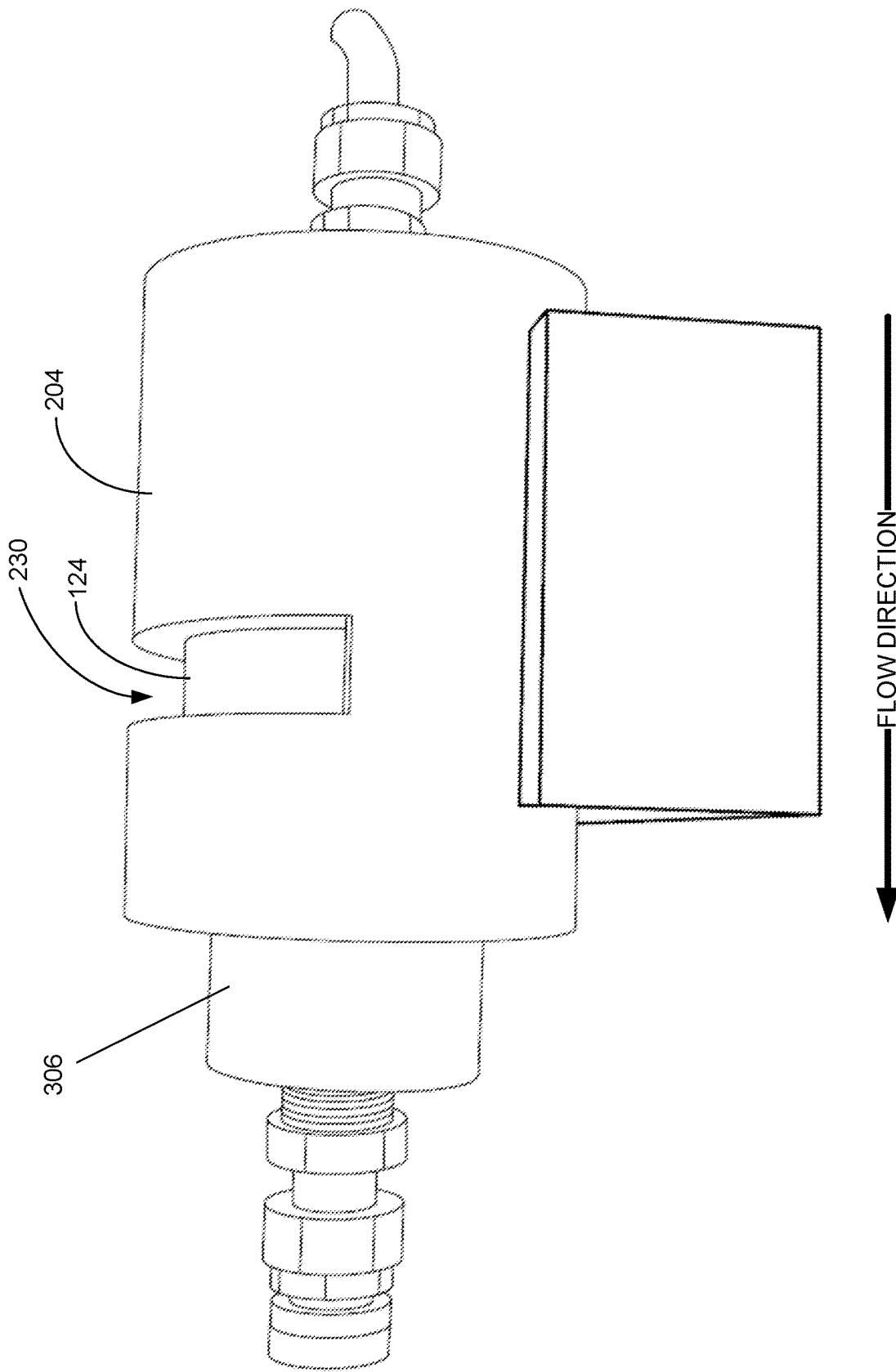
FIG. 8 shows an example of an assembled HVST-TED.

FIG. 8 shows an example of an assembled HVST-TED. The main housing 204 is connected to the secondary housing 306, and sample trap assembly 124 is inserted into the main housing 204 via the side opening 230. Air enters via the distal end of the main housing 204, flow through the sample trap assembly 124, and exits via the proximal end of the secondary housing 306.

Figure 9:
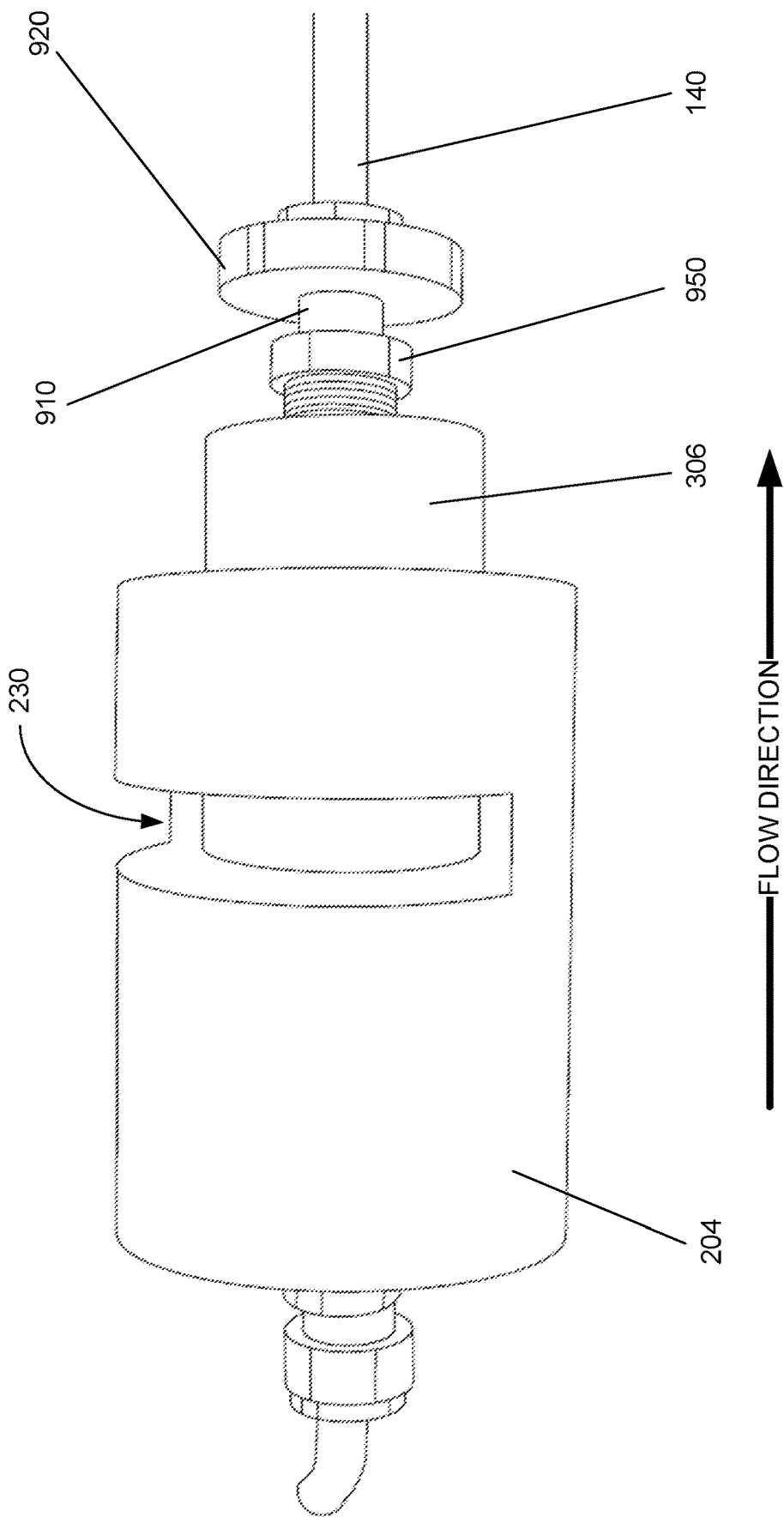
FIG. 9 shows an example of an assembled HVST-TED illustrating connection to a thermal desorption (TD) tube.

FIG. 9 shows an example of an assembled HVST-TED illustrating connection to a TD tube. The side opening 230 in the main housing 204 for receiving the sample trap assembly 124 is more clearly shown. The TD tube 140 is connected to the secondary housing 306 via a proximal connector 950 similar to the proximal connector 150 of FIG. 1. In this example, a graphite ferrule 910 and a thumb wheel 920 are used to tighten the connection between the proximal connector 950 and an inlet end of the TD tube 140. The outlet end of the TD tube may be connected to a vacuum pump.

Figure 10:
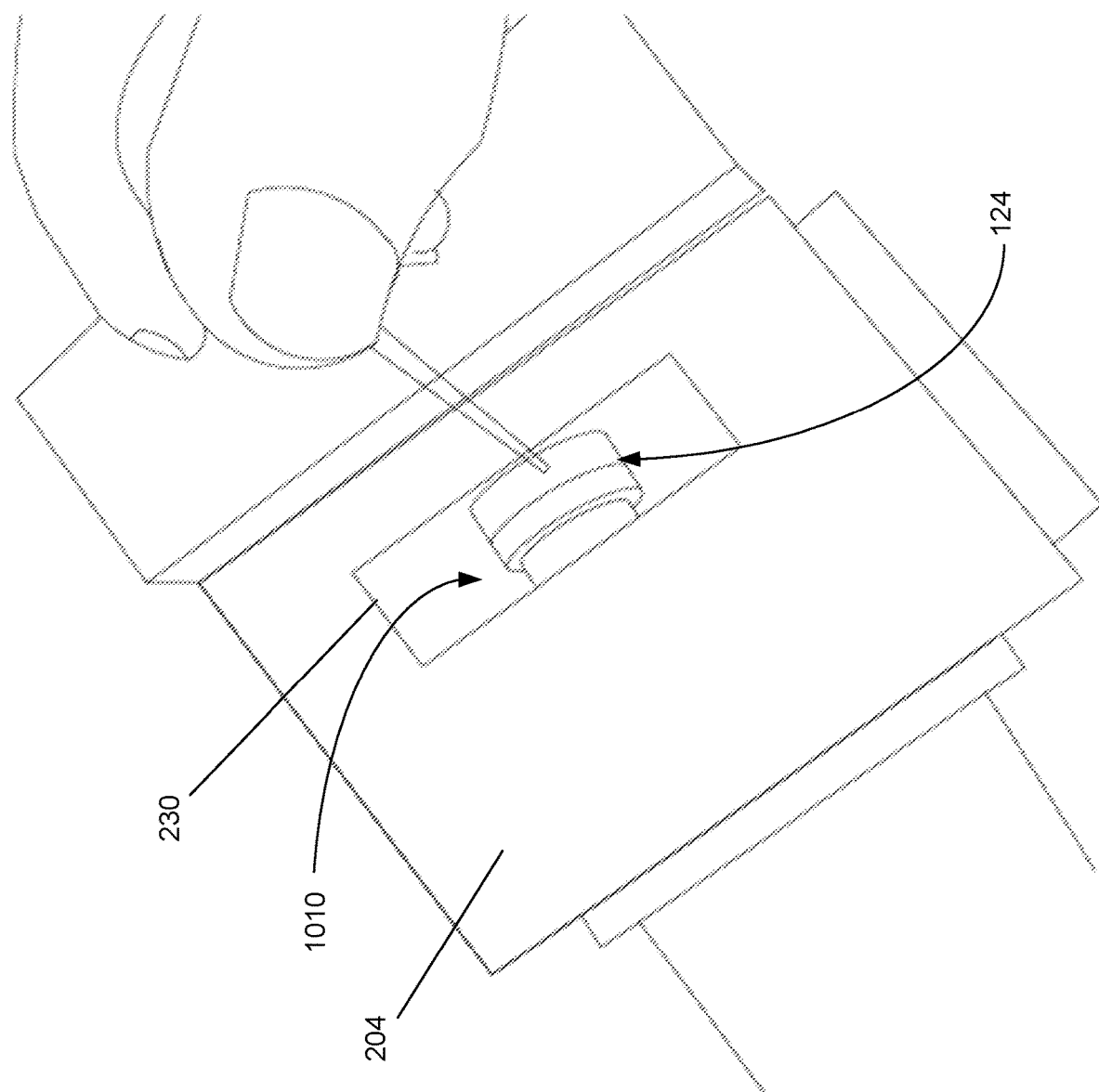
FIG. 10 shows a view illustrating the insertion of the sample trap assembly into the main housing via a side opening.
Figure 11:
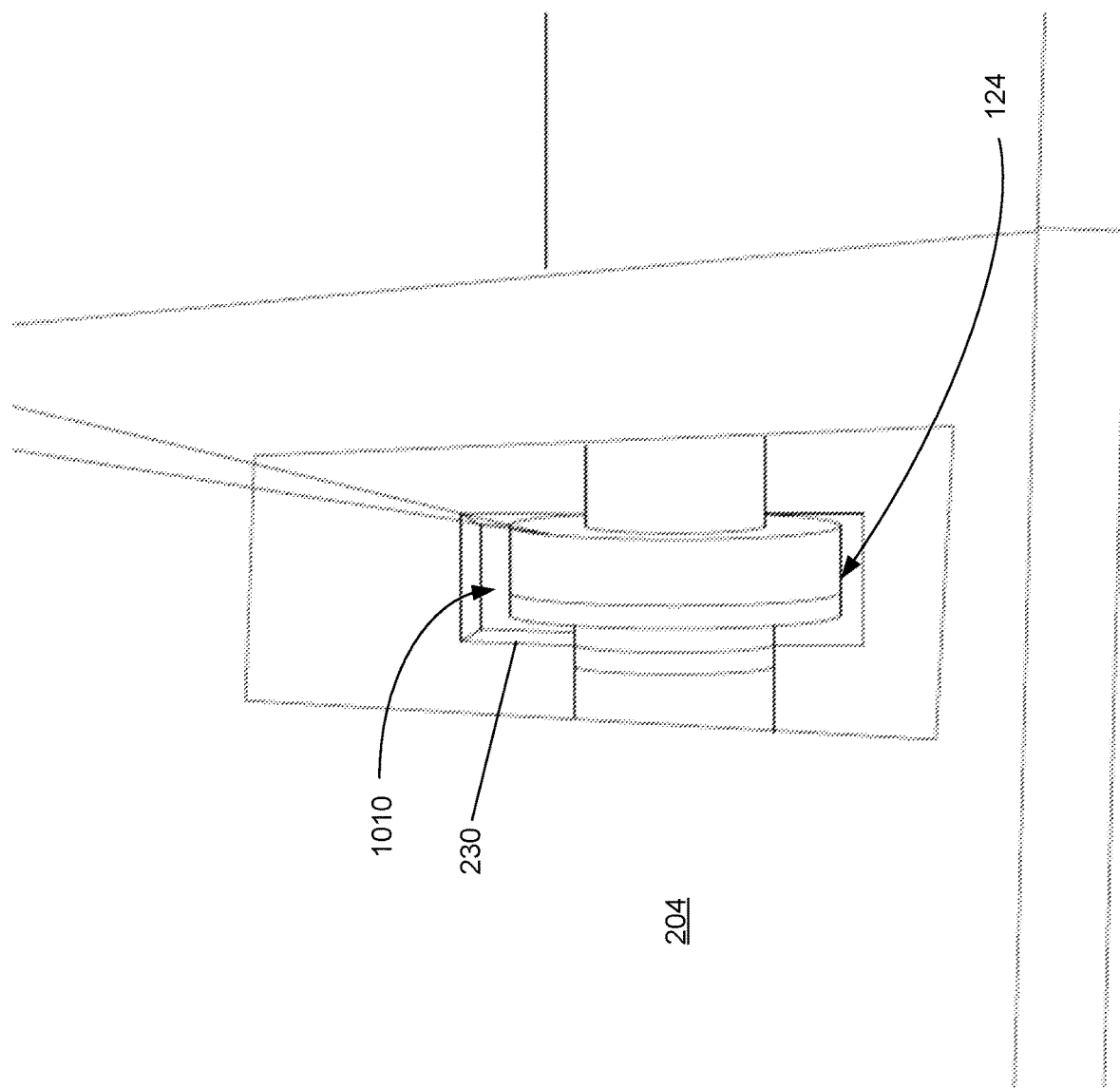
FIG. 11 shows another view illustrating the insertion of the sample trap assembly into the main housing via the side opening.

FIG. 10 shows a view illustrating the insertion of the sample trap assembly 124 into the sample collector location 1010 of the main housing 204 via the side opening 230. FIG. 11 shows another view illustrating the insertion of the sample trap assembly 124 into the sample collector location 1010 of the main housing 204 via the side opening 230. The sample collector location 1010 of the main housing 204 may be configured with the shape and size to receive the sample trap assembly 124 and align it automatically to the gas flow path in the main housing 204. Inserting and removing the sample trap assembly 124 can be done quickly and precisely.

Sample Trap

An embodiment utilizes stainless steel mesh as a constituent of the sample trap 120. The sample trap 120 is a filter made of a mesh stainless steel screen and can be heated to about 200° C. or higher to vaporize materials on its surface. The thermal desorption process may occur within about 20 seconds, or between about 5 and 15 seconds, or between about 5 and 10 seconds. The thermal desorption may be accompanied with a gas flow through the device 100 so as to direct desorbed moieties from the sample trap 120 to the TD collector 140. The gas flow rates may range from approximately 50 cc/minute for about four minutes to about 100 cc/minute for about two minutes.

An embodiment of the sorbent entity comprises 200 mesh (approximately 74 microns) stainless steel with between 75 and 200 milligrams of Tenax-GR backed therein. The trap materials (i.e., resin) are placed in between the two stainless steel wire cloth or fiberglass substrates; then, a tap welding machine is utilized to weld the edges of the cloth together, thereby substantially encapsulating the trap materials within the wire cloth. Generally, when Tenax-GR resin is utilized, its mesh size may be between 80 and 100 or particle sizes having diameters of between about 180 microns and 145 microns. When Tenax TA resin is used, its mesh size may be between about 60 and 80.

A specific embodiment of the sample trap 120 includes a stainless steel 200 mesh. Particle sizes of the adsorbent resin may be about 150 to 250 μm. The sample trap 120 can utilize a mesh portion composed of alternative materials that are inert or non-reactive with the target compounds. For any sample trap 120, in order to accommodate the adsorbent resin particles, the stainless steel mesh is typically smaller than the adsorbent particles.

Thermal Desorption Collector

The TD collector 140 is capable of collecting vapor and any micrometer-sized particles simultaneously. In an embodiment, the TD collector 140 includes an adsorbent such as porous polymer resin. An example is diphenyleneoxide on a heat-resistant substrate such as graphite. Tenax-GR and Tenax-TA resins are available through Scientific Instrument Services of Ringoes, N.J. Other suitable resins include Supelco (Sigma-Aldrich), Restek, Perkin-Elmer, Agilent, and combinations thereof.

Figure 12:
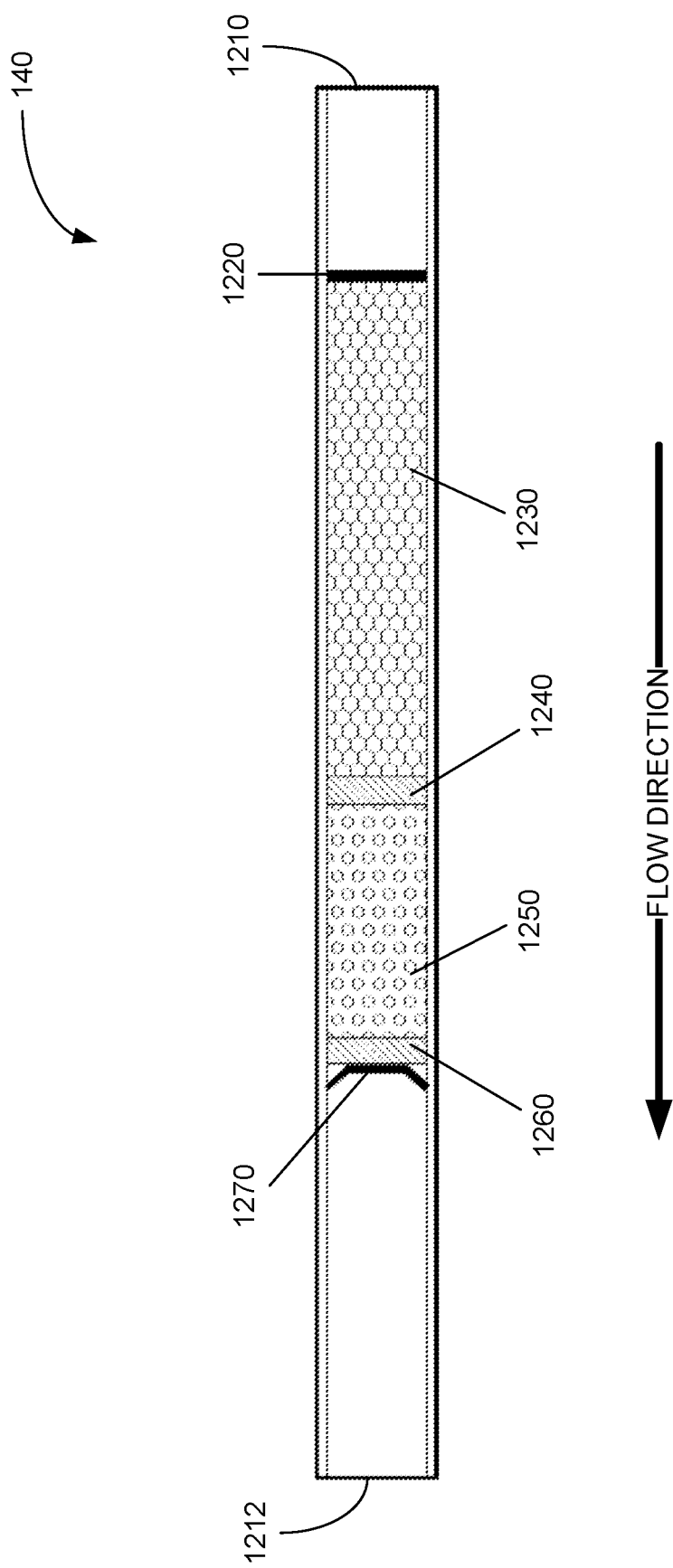
FIG. 12 is a schematic view of an example of a TD tube.

FIG. 12 is a schematic view of an example of a TD tube 140. From the sampling inlet 1210 to the sampling outlet 1212 are disposed a glass frit 1220, Tenax-TA 1230, glass wool 1240, Carboxen-1003 1250, glass wool 1260, and a stainless-steel screen 1270 (e.g., having a mesh size between about 60 and 80). Tenax-TA 1230 is a porous material based on 2,6-diphenylene oxide polymer. It is used to trap volatile and semi-volatile compounds with an upper temperature limit of about 320° C. It has a low affinity for water or methanol. Water has a very low breakthrough value on Tenax adsorbent. Typically, a carbon molecular sieve is used as a backup adsorbent when sampling for very volatile analytes for example, smaller than dichloromethane. Carboxon 1003 is a carbon molecular sieve 1250 with a large surface area and hydrophobic surface characteristics, which provide a combination of efficient absorption/desorption and good hydrophobicity.

Thermal Extraction System

Figure 13:
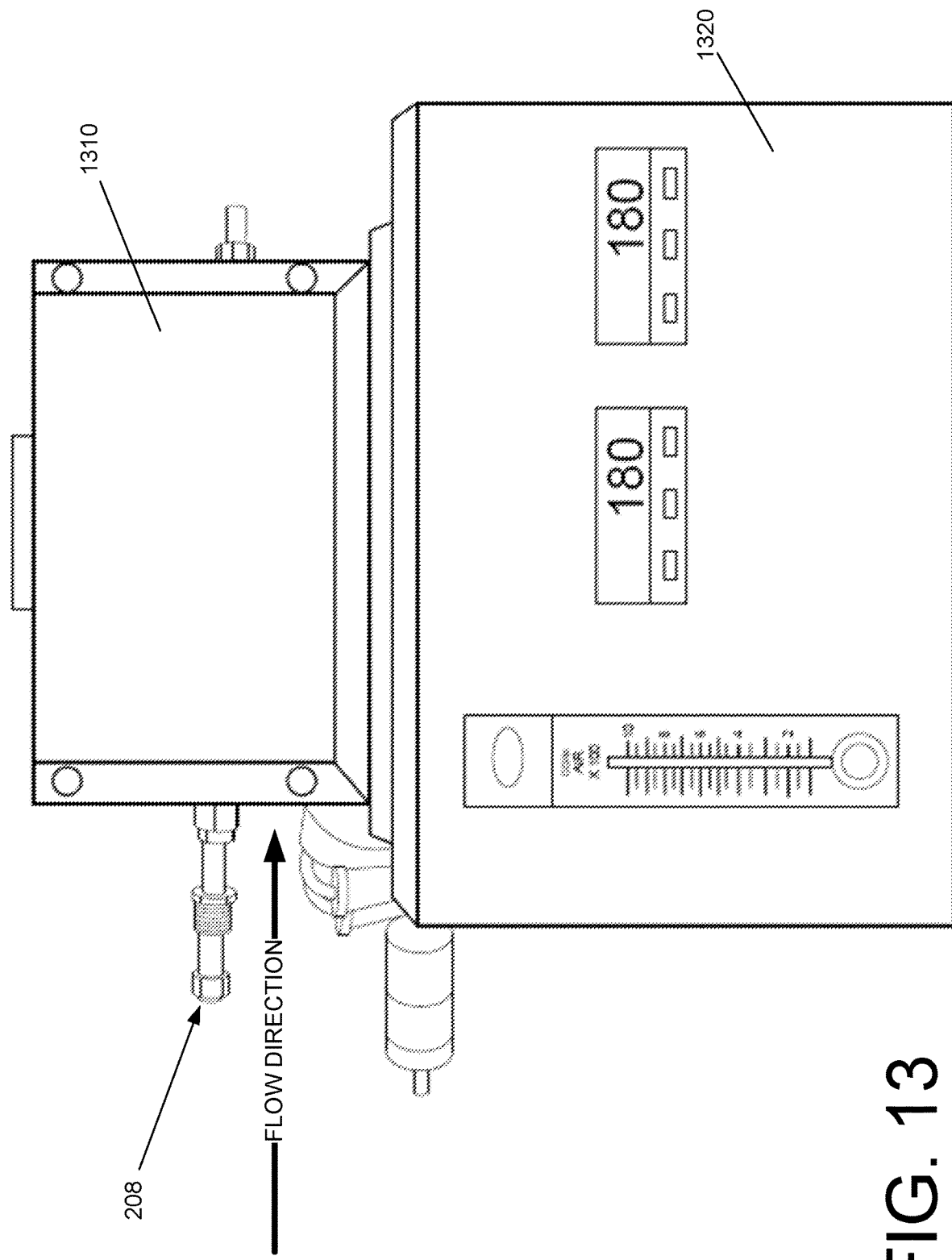
FIG. 13 shows an example of an external housing for the HVST-TED.

FIG. 13 shows an example of an external housing 1310 for the HVST-TED having a gas flow inlet at the distal end 208. A temperature control unit 1320 is provided to control the temperature of the main housing 204 in which the sample trap 124 is removably placed. For example, the temperature control unit 1320 is coupled with the downstream heating cartridge 242 and the upstream heating cartridge 244 of the main housing 204 in FIG. 2 for heating and the downstream RTD probe 252 and the upstream RTD probe 254 for measuring the temperature. The temperature control unit 1320 uses the temperature measurement from the RTD probes as feedback for controlling thermal outputs of the heating cartridges to achieve the desired temperatures. Various temperature control units (TCUs) are commercially available. Any suitable unit can be used or adapted to be used as means or a mechanism for controlling the temperature of the heating members.

FIG. 14 shows an example of a thermal extraction system 1400 including the external housing 1310 for the HVST-TED and the temperature control unit 1320 of FIG. 13. The system 1400 includes an inlet flow line 1404 into and an outlet flow line 1406 out of the HVST-TED inside the external housing 1310, and the cooling coil 160 wrapped around the TD tube 140. The LN2 cooling temperature is below set point (10° C.) around the TD tube 140. The outlet flow line 1406 is a low-flow TD sampling pump line (negative pressure) connected to the sampling outlet 1212 of the TD tube 140 in FIG. 12. In one example, the gas flow rate is set at about 50-100 cc/minute for about 2-4 minutes, while the temperature control unit 1320 is set at about 200° C. near the distal end 208 and about 190° C. near the proximal end of the main housing 204 in FIG. 2.

At the start of an example process, the sample trap 120 has collected therein gas phase moieties and potentially micrometer-sized particle samples from a target area. The sample trap 120 is placed inside the main housing 204 of the HVST-TED, heat is applied, and a gas flow is directed through the interior of the main housing 204, for instance, by applying a negative pressure to the proximal end downstream of the main housing 204 and the secondary housing 306. For example, the heater increases the temperature of the sample trap 120 to about 190-200° C. within about 10 seconds. Under the heating and gas flow, the gaseous moieties and any particle moieties are released from the sample trap 120 and collected by the TD tube 140 downstream. A LN2 cooling system provides the LN2 cooling coil 160 wrapped around the TD tube 140. Once the cooling temperature reaches below about 10° C., a sample pump is activated to apply the negative pressure.

The adsorbent resin in the TD tube 140 disposed downstream of the secondary housing 306 collects vapor-phase sample and any particle sample collected in the sample trap 120 that are released by the heating and gas flow therethrough. In one embodiment, the TD tube 140 collects sample at a gas flow rate of about 50-100 mL/min for about 2-4 minutes. Vapor-phase and any micrometer-sized particle samples are collected using the TD collector 140 connected to the proximal end 346 of the secondary housing 306. Some of the target analytes in explosive vapor sampling include high volatile organic compounds (e.g., MNT, NG, EGDN, and DMNB (taggant)).

The TD tube 140 is then separated from the TED and inserted directly into a TD-GC/MS. For a reusable TD tube, this desorption step serves also as a regeneration step for the TD tube 140. As such, the TD tube 140 is subsequently reconnected to the housing 104, 106 of the TED, and the device is ready for another round of sample taking.

Thermal Desorption-Gas Chromatography/Mass Spectrometry (TD-GC/MS)

Once the sample trap 120 is heated and analyte is collected in the TD collector 140, the TD collector (e.g., TD tube) 140 can be then analyzed by inserting it directly into the thermal desorption-gas chromatography/mass spectrometer (TD-GC/MS) for analysis of the collected sample. A TDS (thermal desorption system) is coupled onto the GC injection port and the TD tube is inserted in the TDS. The vaporized analytes are re-tapped into a PTV (Programmed Temperature Vaporizer), which is set at about −40° C. The specified end temperature may be set at about 280° C. and the PTV is rapidly raised temperature ramp rate at 12° C./second. Once the PTV is reached at the end temperature at about 280° C. the operation system activates the MS to collect data.

The inventive concepts taught by way of the examples discussed above are amenable to modification, rearrangement, and embodiment in several ways. Accordingly, although the present disclosure has been described with reference to specific embodiments and examples, persons skilled in the art will recognize that changes may be made in form and detail without departing from the spirit and scope of the disclosure.

The claims define the invention and form part of the specification. Limitations from the written description are not to be read into the claims.

An interpretation under 35 U.S.C. § 112(f) is desired only where this description and/or the claims use specific terminology historically recognized to invoke the benefit of interpretation, such as "means," and the structure corresponding to a recited function, to include the equivalents thereof, as permitted to the fullest extent of the law and this written description, may include the disclosure, the accompanying claims, and the drawings, as they would be understood by one of skill in the art.

To the extent the subject matter has been described in language specific to structural features and/or methodological steps, it is to be understood that the subject matter defined in the appended claims is not necessarily limited to the specific features or steps described. Rather, the specific features and steps are disclosed as example forms of implementing the claimed subject matter. To the extent headings are used, they are provided for the convenience of the reader and are not be taken as limiting or restricting the systems, techniques, approaches, methods, devices to those appearing in any section. Rather, the teachings and disclosures herein can be combined, rearranged, with other portions of this disclosure and the knowledge of one of ordinary skill in the art. It is the intention of this disclosure to encompass and include such variation. The indication of any elements or steps as "optional" does not indicate that all other or any other elements or steps are mandatory.

What is claimed is:

1. A thermal extraction apparatus comprising:
  a housing having a gas inlet and a gas outlet to receive a gas flow through the housing from the gas inlet to the gas outlet, and a side opening to receive a sample collector into a sample collector location, the sample collector having a sample collector adsorbent containing a vapor sample;
  a pump to generate the gas flow;
  a heater to heat the sample collector adsorbent of the sample collector to a temperature sufficient to release the vapor sample, the heater being disposed in the housing and including an upstream heating member upstream of the sample collector location for receiving the sample collector and a downstream heating member downstream of the sample collector location;

a thermal desorption (TD) tube downstream of the heater and the housing and connected with the gas outlet of the housing to receive the gas flow downstream of the sample collector and collect the vapor sample released from the sample collector adsorbent of the sample collector;

a cooling member in heat exchange with the TD tube to cool the TD tube; and a temperature control unit configured to control an upstream temperature of the upstream heating member and a downstream temperature of the downstream heating member to heat the housing in a region adjacent the sample collector adsorbent of the sample collector to a temperature of at least about 200° C.;

the housing including an upstream frustoconical cavity between the gas inlet and the sample collector location increasing in cross-sectional area from the gas inlet to the sample collector location.

2. The thermal extraction apparatus of claim 1,
wherein the temperature control unit is configured to control an upstream temperature of the upstream heating member and a downstream temperature of the downstream heating member to be lower than the upstream temperature.

3. The thermal extraction apparatus of claim 2, further comprising:

an upstream thermometer coupled with the housing to measure the upstream temperature which is used as feedback by the temperature control unit to control thermal output of the upstream heating member; and a downstream thermometer coupled with the housing to measure the downstream temperature which is used as feedback by the temperature control unit to control thermal output of the downstream heating member.

4. The thermal extraction apparatus of claim 2,
wherein the temperature control unit is configured to control an upstream temperature of the upstream heating member to about 200° C. and a downstream temperature of the downstream heating member to about 190° C.

5. The thermal extraction apparatus of claim 1,
wherein the cooling member comprises a coil around the TD tube and having a cooling fluid flowing through the coil to cool the TD tube to a temperature of about 0-10° C.

6. The thermal extraction apparatus of claim 1,
wherein the housing includes a downstream frustoconical cavity between the sample collector location and the gas outlet decreasing in cross-sectional area from the sample collector location to the gas outlet.

7. The thermal extraction apparatus of claim 1,
wherein the cooling member comprises a coil around the TD tube and having a cooling fluid flowing through the coil to cool the TD tube.

8. A thermal extraction apparatus comprising:

a housing having a gas inlet and a gas outlet to receive a gas flow through the housing from the gas inlet to the gas outlet, and an insertion port to receive a sample collector into a sample collector location, the sample collector having a sample collector adsorbent containing a vapor sample;

a pump to generate the gas flow;

heating means for heating the housing in a region adjacent the sample collector adsorbent of the sample collector to a temperature of at least about 200° C. to facilitate release of the vapor sample from the sample collector adsorbent of the sample collector; and a thermal desorption (TD) tube downstream of the heating means and the housing and connected with the gas outlet of the housing to receive the gas flow downstream of the sample collector and collect the vapor sample released from the sample collector adsorbent of the sample collector;

the housing including an upstream frustoconical cavity between the gas inlet and the sample collector location increasing in cross-sectional area from the gas inlet to the sample collector location.

9. The thermal extraction apparatus of claim 8, further comprising:

cooling means for cooling the TD tube to a temperature sufficiently low to facilitate collection of the vapor sample released from the sample collector.

10. The thermal extraction apparatus of claim 9,
wherein the cooling means cools the TD tube to a temperature of about 0-10° C.

11. The thermal extraction apparatus of claim 8,
wherein the heating means heats an upstream portion of the housing upstream of the insertion port to an upstream temperature of about 200° C. and a downstream portion of the housing downstream of the insertion port to a downstream temperature of about 190° C.

12. The thermal extraction apparatus of claim 8,
wherein the housing includes a downstream frustoconical cavity between the sample collector location and the gas outlet decreasing in cross-sectional area from the sample collector location to the gas outlet.

13. A thermal extraction method comprising:

placing a sample collector, which has a sample collector adsorbent containing a vapor sample, inside a housing via a side opening into a sample collector location;

heating the housing in a region adjacent the sample collector adsorbent of the sample collector to a temperature of at least about 200° C. to facilitate release of the vapor sample from the sample collector adsorbent; and directing a gas flow through a gas inlet of the housing through the sample collector adsorbent of the sample collector through a gas outlet of the housing to a thermal desorption (TD) tube connected with the gas outlet of the housing and disposed downstream of the housing to receive the gas flow downstream of the sample collector and collect the vapor sample released from the sample collector adsorbent of the sample collector inside the TD tube;

the housing including an upstream frustoconical cavity between the gas inlet and the sample collector location increasing in cross-sectional area from the gas inlet to the sample collector location.

14. The thermal extraction method of claim 13, further comprising:

cooling the TD tube to a temperature sufficiently low to facilitate collection of the vapor sample released from the sample collector.

15. The thermal extraction method of claim 14,
wherein the TD tube is cooled to a temperature of about 0-10° C.

16. The thermal extraction method of claim 14,
wherein cooling the TD tube comprises placing a coil around the TD tube and flowing a cooling fluid through the coil to cool the TD tube to a temperature of about 0-10° C.

17. The thermal extraction method of claim 13,
wherein heating the sample collector adsorbent of the sample collector comprises heating the housing in an upstream region adjacent the sample collector to an upstream temperature of about 200° C. and heating the housing in a downstream region adjacent the sample collector to a downstream temperature of about 190° C.

18. The thermal extraction method of claim 17, further comprising:
placing an upstream heater in the upstream region of the housing to heat the upstream region and placing a downstream heater in the downstream region of the housing to heat the downstream region.

19. The thermal extraction method of claim 18, further comprising:
measuring the upstream temperature of the housing and using the measured upstream temperature as feedback to control thermal output of the upstream heater; and
measuring the downstream temperature of the housing and using the measured downstream temperature as feedback to control thermal output of the downstream heater.

20. The thermal extraction method of claim 13, further comprising:
controlling the gas flow to have a gas flow rate of about 50-100 cc/minute for about 2-4 minutes through the sample collector to the TD tube to collect the vapor sample from the sample collector in the TD tube.

21. The thermal extraction method of claim 13, further comprising:
placing the TD tube having the vapor sample collected therein into a Thermal Desorption-Gas Chromatography/Mass Spectrometer (TD-GC/MS) for sample analysis of the vapor sample collected in the TD tube.

22. The thermal extraction method of claim 13,
wherein the gas flow is directed through the gas inlet of the housing through the sample collector adsorbent of the sample collector at the sample collector location through the gas outlet of the housing to the TD tube; and
wherein the housing includes a downstream frustoconical cavity between the sample collector location and the gas outlet decreasing in cross-sectional area from the sample collector location to the gas outlet.

* * * * *